United States Patent [19]
Corris et al.

[11] Patent Number: 4,654,481
[45] Date of Patent: Mar. 31, 1987

[54] SECURITY SYSTEM FOR CORDLESS EXTENSION TELEPHONES

[75] Inventors: C. James Corris, Shenandoah; Blaine E. Beck, Peachtree City, both of Ga.

[73] Assignee: Cellutron Corporation, Peachtree City, Ga.

[21] Appl. No.: 538,989

[22] Filed: Oct. 4, 1983

[51] Int. Cl.[4] .............................................. H04M 1/70
[52] U.S. Cl. .......................................... 379/62; 380/23
[58] Field of Search ................. 179/2 E, 2 EA, 1.5 R; 455/70

[56] References Cited

U.S. PATENT DOCUMENTS

| | | | |
|---|---|---|---|
| 4,039,760 | 8/1977 | Gregory et al. | 179/41 A |
| 4,053,717 | 10/1977 | Snider | 179/2 EA |
| 4,119,800 | 10/1978 | Girardi | 179/2 EA |
| 4,291,197 | 9/1981 | Yonaga | 179/2 EA |
| 4,332,981 | 6/1982 | Palombi et al. | 179/2 EA |
| 4,369,443 | 1/1983 | Giallanza et al. | 455/70 |
| 4,436,957 | 3/1984 | Mazza et al. | 179/2 EA |
| 4,467,140 | 8/1984 | Fathauer et al. | 179/2 EA |
| 4,469,918 | 9/1984 | Cripps | 179/2 EA |

Primary Examiner—Salvatore Cangialosi
Assistant Examiner—Aaron J. Lewis
Attorney, Agent, or Firm—Vorys, Sater, Seymour & Pease

[57] ABSTRACT

In a cordless extension telephone system in which a base station is connected to telephone lines and communicates with a remote station by radio transmission, the base station in response to the presence of a ring signal on the telephone lines repeatedly transmits an eleven bit code at a predetermined bit rate. The remote station upon receiving the eleven bit code at least three times in succession generates an audio signal to indicate the presence of a incoming call. The user at the remote station may actuate a control to an "on" position or an "off" position. The remote station responds to the actuation of the control and will repeatedly transmit the eleven bit code plus one additional bit having a state indicating whether the control is actuated to the "on" state or the "off" state. The base station in response to receiving the eleven bit code at least three times in succession will enble or disable an isolation circuit in accordance with the twelfth bit of the code. The isolation circuit when enabled, will apply the signal on the telephone lines to the input of the transmitter of the base station and the output of the receiver of the base station to the telephone lines.

3 Claims, 1 Drawing Figure

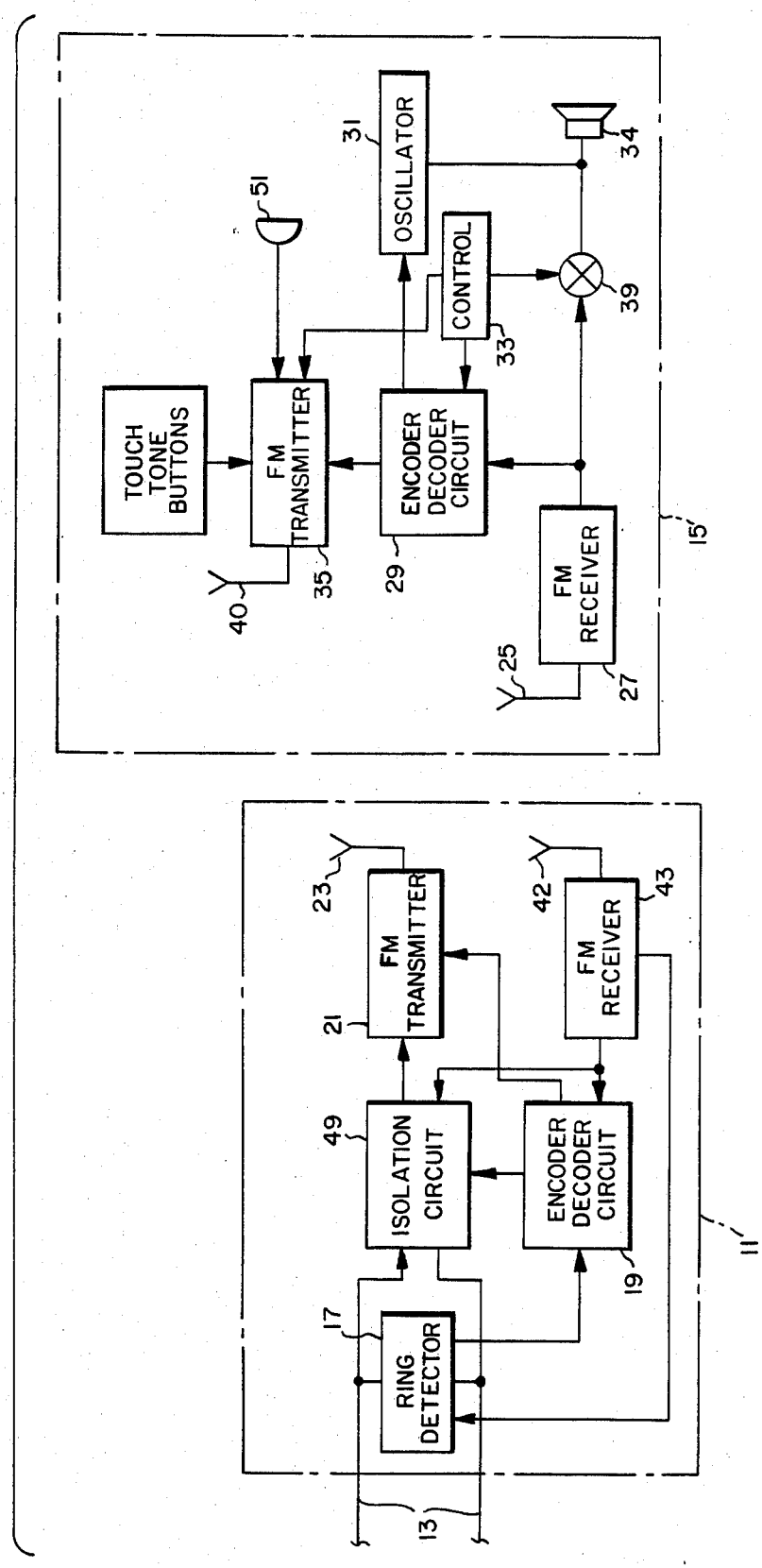

SECURITY SYSTEM FOR CORDLESS EXTENSION TELEPHONES

BACKGROUND OF THE INVENTION

This invention relates to cordless extension telephone systems and more particularly, to such systems employing a digital encoding technique to achieve access security from other systems and extraneous noise.

One of the problems with the cordless extension telephones which are presently on the market is their lack of reliable access security; that is, the systems presently in use fail to reject remote signals from other phone systems or other extraneous noise signals. Most cordless extension phone systems now in use employ a background pilot tone beyond the audible pass band. By using different pilot tones for different extension phone sets, each extension phone set is intended to exclude the signals from other sets and also from extraneous noise systems. However, the number of available security pilot tones is limited, and, with the increasing popularity of cordless extension phones and the increased proliferation of these devices over the next few years, the problem of access security on each extension phone set will become increasingly acute.

There have been proposed systems in which encoding techniques are used to achieve access security, but these systems in the prior art are relatively complex and of questionable reliability and accordingly have had no impact upon the art.

SUMMARY OF THE INVENTION

An object of the present invention is to overcome the above-described problems in the prior art extension cordless phone systems. In accordance with the present invention, whenever a change in the status of the remote station or the base station is to be signalled to the other station, such as when the user of the remote unit wants to initiate or terminate a call, or when a call is initiated by ring signal received by the base station, the station signalling the change in status will repeatedly transmit a 12 bit self-clocking code which code is modulated by FM modulation on the carrier frequency used for transmission between the stations. The first 11 bits together with the bit rate that the code is transmitted uniquely identify the cordless extension phone set comprising the base station and the remote station. The twelfth and last bit of the code indicates function such as whether the receiving station is to go to an "on hook" or "off hook" status. The first 11 bits of the code are compared with a code preset at the receiving station and when the code has been received three times in succession by the receiving station at the bit rate at which the receiving station is set to receive, the receiving station will respond to the code. With this arrangement there is provided a simple yet very reliable system, in which it is extremely unlikely for any extraneous signal to be recognized as a valid code.

Further objects and advantages of the present invention will become readily apparent as the following detailed description of the invention unfolds and when taken in conjunction with the drawings.

BRIEF DESCRIPTION OF THE DRAWINGS

The single FIGURE of the drawing is a block diagram schematically illustrating a cordless extension phone set in accordance with the present invention.

DESCRIPTION OF THE PREFERRED EMBODIMENT

As shown in the drawings, a base station 11 is connected to conventional telephone lines 13 and is adapted to communicate with a portable remote station 15. The base station 11 and the remote station 15 communicate with each other by FM radio signals with the signal transmitted from the base station 11 to the remote station 15 being on one FM channel and the signal transmitted from the remote station 15 to the base station 11 being on a different FM channel.

When a ring signal is received over telephone lines 13, the presence of this ring signal on the telephone lines will be detected in the base station by a ring signal detector 17, which in response to the ring signal, will apply a signal to an encoder decoder circuit 19, indicating that a ring signal is being received. The encoder decoder circuit 19, in response to receiving this signal from the ring signal detector 17, will be switched to the encode mode and will repeatedly generate a 12 bit self-clocking code, which may for example be a Manchester code. The base station and the remote station will be assigned a particular 11 bit binary code, which is preset for the encoder decoder circuit 19 by a permanent circuit cut into a printed circuit board. The first 11 bits of the 12 bit code generated by the encoder decoder circuit 19 will be the 11 bits preset for the encoder decoder circuit. The encoder decoder circuit will normally be in a decode mode when no ring signal is being received by the ring detector 17, but it will be switched to and remain in the encode mode of operation and repeatedly generate the 12 bit code for as long as the signal is applied thereto from the ring signal detector 17 indicating that a ring signal is being received. The 12 bit self-clocking code will represent the binary bits by alternate transitions in signal level with their being at least one transition in signal level for each binary bit to make the signal self-clocking. The code generated by the encoder decoder circuit 19 is applied to an FM transmitter 21, which will modulate its FM carrier with the applied code by switching between two frequencies within the FM channel at the time of each transition in the self-clocking code. The repeated 12 bit code modulated on the FM carrier by the transmitter 21 is applied to antenna 23 for transmission and will be picked up by the antenna 25 of the remote station 15. The FM signal is received at the remote station by a receiver 27 which is tuned to the FM channel of the transmittor 21 and which demodulates the received signal and applies it to an encoder decoder circuit 29. The encoder decoder circuit 29 is like the encoder decoder circuit 19 and has the particular code for the cordless extension phone set preset by being cut into a printed circuit board. The encoder decoder circuit 29 will normally be in a decode mode and will compare the first 11 bits of each received code in the signal demodulated by the receiver with the code preset in the encoder decoder circuit 29. The encoder decoder circuit 19 counts each time in succession the correct 11 bits are received. If the correct 11 are received three times in succession, the encoder decoder circuit 29 enables an oscillator 31 which applies an audio signal to a speaker 34 at the remote station 15 to cause the speaker to generate an audible tone indicating that an incoming call is being received. A person within hearing range of the tone 31 may actuate the on/off control 33 to an "on" position by means of a button. The actuation of the control 33 to the "on" position switches the encoder decoder circuit 29 to the encode mode, turns on an FM transmittor 35 and closes an electronic switch 39 to connect the output of the receiver 27 to the speaker 34. When the encoder decoder circuit 29 has been switched to the encode mode by the control 33 being actuated to the "on" position, the encoder decoder circuit will generate a 12 bit binary code at least three times in succession and apply the code to the FM transmitter 35. The first 11 bits of the binary code will be the particular 11 bit to code preset in the encoder decoder circuit 29 and the twelfth bit of the binary code will be a "1" to indicate that the code is being transmitted in response to the control 33 being actuated to its "on" position. The transmitter 35 upon receiving the repeated binary code, will modulate its FM carrier with a 12 bit code in the same manner as the transmitter 21 and will transmit the binary code via an antenna 40 to the base station 11. The transmitted code will be in the same self-clocking form as that transmitted by the base station. The FM signal transmitted by transmitter 35 from the antenna 40 will be picked up by an antenna 42 and applied to a receiver 43 in the base station 11, which is tuned to the FM channel of the transmitter 35 and will demodulate the received signal and apply it to the encoder decoder circuit 19. In addition, the receiver 43 in response to detecting the presence of the FM carrier transmitted by the transmittor 35, will apply a signal to the ring signal detector 17 to shut it down and stop the ring signal.

As a result, the ring signal detector 17 will stop applying the signal indicating the presence of a ring signal to the encoder decoder circuit 19, which as a result will be switched back to its decode mode. Accordingly, the demodulated code applied by the receiver 43 will be decoded by the encoder decoder circuit 19 and compared with the preset code. If a received encoded signal is received with the proper first 11 bits three times in succession by the encoder decoder circuit 19, the circuit 19 will control the state of isolation circuit 49 in accordance with the last or twelfth bit of the received twelve bit code. If the twelfth bit is a binary "1" indicating that the control 33 in the remote station was actuated to the "on" position, the encoder decoder circuit 19 will enable the isolation circuit 49 to transmit audio signals from the telephone lines 13 to the transmitter 21 and from the receiver 43 to the telephone lines 13. The circuit 49 will then transmit any audio signal received in the telephone lines 13 to the FM transmitter 21, which will then transmit the audio signal by FM modulation of the carrier to the remote station 15 via the antenna 23. At the remote station 15 the receiver 27 will continue to demodulate the signal received on the antenna 25 and thus will reproduce the audio signal received on telephone lines 13 at its output and apply it to the speaker 34 through the switch 39. In this manner the audio signal received on telephone lines 13 will be transduced into audio by the speaker 34. At the same time the transmitter 35 will FM modulate its carrier with any audio signal received from a microphone 51 in the remote station and transmit the resulting FM signal to the base station 11. The receiver 43 will demodulate this audio signal which will be then applied through isolation circuit 49 to the telephone lines 13. In this manner the audio signal picked up by the microphone 51 at the remote station 15 is transmitted out over the telephone lines 13 to the telephone from which the incoming call was received and audio communication between the remote station 15 and the telephone lines 13 may take place as with a conventional telephone.

The encoder decoder circuit 19 will maintain the isolation circuit enabled until it receives a repeated code indication that the control 33 has been actuated to the "off" position. When the control 33 is actuated to the "off" position, the encoder decoder circuit 29 in response to this change of position of the control 33 will apply 12 bit self-clocking code at least three times in succession to the transmitter 35. The first 11 bits of the code will again be the particular 11 bit code assigned to the cordless extension phone set and preset in the encoder decoder circuit 29. The twelfth bit of the code however, instead of being a "1" will be a "0" to indicate the actuation of the control 33 to the "off" position. The twelve bit code upon being demodulated by the receiver 43, will be applied to the encoder decoder circuit 19, where the first 11 bits of each repetition of the code is compared with the internally preset code in the encoder decoder circuit. If the correct 11 bits are received three times in succession, the encoder circuit 19 will then change the state of the isolation circuit 49 in accordance with the twelfth bit, which if it is a "0" will cause the circuit 49 to be disabled to disconnect the telephone lines 13 from the transmitter 21 and receiver 43.

If a person at the remote station 15 wants to initiate a call he first actuates the control 33 to the "on" position. This change in position of the control 33, as explained above, will cause the encoder decoder circuit 29 to transmit a 12 bit code at least three times in succession with the twelfth bit being a "1" to signify that the control 33 has been actuated to the "on" position. The transmitter 35 will then FM modulate the 12 bit code and transmit it to the base station 11, where it will be demodulated by the receiver 43 and applied to the encoder decoder circuit 19. The encoder decoder circuit 19 upon receiving the 12 bit code three times in succession will enable the isolation circuit 49 in accordance with the twelfth bit being a binary "1". As a result the dial tone on the telephone lines 13 will be applied through the circuit 49 to the transmitter 21 and be transmitted on the FM carrier to the remote station 15. At the remote station the FM signal will be received by the receiver 27, which will reproduce the dial tone at its output and thus cause the speaker 34 to transduce the dial tone into audio indicating to the user that he is now connected to the telephone lines 13 and he may commence his dialing operation. The user at the remote station 15 then operates touch-tone buttons 53 in the conventional manner to dial a selected number. Each touch tone signal generated by the touch tone buttons will be FM modulated by the transmitter 35 and transmitted to the base station 11, where they will be demodulated by the receiver 43 and applied to the isolation circuit 49. The circuit 49 will then apply the touch-tone signals to the output telephone lines and the call will then proceed in an analgous manner to a conventional touch-tone call.

It will be apparent that the 11 unique bits transmitted and received three times before the base station or the remote station will respond greatly reduces the chance that either the base station or the remote station will improperly respond to a remote signal from another phone station or to an extraneous noise signal. To further reduce the possibility that the base station or remote station of one communicating set of stations will improperly respond to signals from another nearby set of stations, the encoder decoder circuits 19 and 29 are each set to operate at a particular bit rate by local oscillators. In the decode mode these local oscillators will synchronize with the clock signal in the received self-clocking codes. If the frequency of the local oscillator does not correspond with the bit rate of the received code, the encoder decoder circuits 19 and 29 will not respond to the received code to control the isolation circuit or enable the oscillator 31. The 11 bit code gives 2,048 discreet codes, making possible 2,048 different cordless extension telephone sets which will not respond to each other. By using different bit rates for the different cordless extension telephone sets, the number of different cordless extension phone sets that can be used in the same geographical area is multiplied many times.

The above description is of a preferred embodiment of the invention and many modifications may be made thereto without departing from the spirit and scope of the invention, which is defined in the appended claims.

What is claimed is:

1. A cordless extension telephone system comprising a base station connected to telephone lines and a remote station, said base station having a base station radio transmitter tuned to a first carrier frequency, a base station radio receiver tuned to a second carrier frequency, isolation circuit means operable when enabled to apply the signal on said telephone lines to an input of said base station transmitter to be radio transmitted thereby and to apply the signal produced at the output of said base station receiver to said telephone lines, and base station encoder decoder responsive to the presence of a ring signal on said telephone lines to repeatedly cause said base station radio transmitter to radio transmit a first multibit code, responsive to said base station receiver receiving a second multibit code a plurality of times to enable said isolation circuit means, and responsive to said base station receiver receiving a third multibit code a plurality of times to disable said isolation circuit means, said remote station having a remote station radio receiver tuned to said first carrier frequency, a remote station radio transmitter tuned to said second carrier frequency, a microphone, a speaker, circuit means to connect said microphone to the input of said remote station transmitter and to connect the output of said remote station receiver to said speaker, a control actuable to an "on" position and to an "off" position and remote station encoder decoder means responsive to said remote station receiver receiving said first multibit code to generate a signal perceivable by a user at said remote station, responsive to said control being actuated to said "on" position to cause said remote station transmitter to radio transmit said second multibit code a plurality of times, responsive to said control being actuated to said "off" position to cause said transmitter to radio transmit said third multibit code.

2. A cordless extension telephone system as recited in claim 1, wherein said second multibit code comprises the bits of said first multibit code plus one additional bit of a first predetermined value and said third multibit code comprises the bits of said first multibit code plus one additional bit of a second predetermined value different then said first predetermined value.

3. A telephone system as recited in claim 1, wherein said base station includes a ring detection means to detect the presence of a ring signal on said telephone lines and apply a control signal to said base station encoder decoder means to indicate the presence of a ring signal on said telephone lines, said base station encoder decoder means normally being in a decode mode to decode multibit codes applied thereto by said base station receiver and being switched whenever said control signal is applied to an encode mode to repeatedly generate said first mutltibit code, said receiver including circuit means responsive to said receiver receiving said second carrier frequency to stop said ring detection means from applying said control signal to said base station encoder decoder means.

* * * * *